(12) United States Patent
Sasaki et al.

(10) Patent No.: US 11,707,940 B2
(45) Date of Patent: Jul. 25, 2023

(54) RECORDING APPARATUS

(71) Applicant: SEIKO EPSON CORPORATION, Tokyo (JP)

(72) Inventors: Keisuke Sasaki, Matsumoto (JP); Haruki Miyasaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 4 days.

(21) Appl. No.: 16/876,277

(22) Filed: May 18, 2020

(65) Prior Publication Data
US 2020/0369057 A1    Nov. 26, 2020

(30) Foreign Application Priority Data

May 21, 2019   (JP) ................................ 2019-095327

(51) Int. Cl.
| | |
|---|---|
| *B41J 29/13* | (2006.01) |
| *B41J 2/01* | (2006.01) |
| *B41J 13/10* | (2006.01) |
| *H04N 1/00* | (2006.01) |
| *B41J 15/04* | (2006.01) |
| *B41J 25/00* | (2006.01) |

(52) U.S. Cl.
CPC ................. *B41J 29/13* (2013.01); *B41J 2/01* (2013.01); *B41J 13/10* (2013.01); *B41J 15/04* (2013.01); *B41J 25/001* (2013.01); *H04N 1/0057* (2013.01); *H04N 1/00631* (2013.01)

(58) Field of Classification Search
None
See application file for complete search history.

(56) References Cited

U.S. PATENT DOCUMENTS

| | | | |
|---|---|---|---|
| 9,300,826 B2* | 3/2016 | Takahata | H04N 1/00525 |
| 2005/0151782 A1* | 7/2005 | Ishida | B41J 29/02 |
| | | | 347/49 |
| 2005/0231772 A1* | 10/2005 | Kitaoka | H04N 1/00591 |
| | | | 358/498 |
| 2012/0086967 A1 | 4/2012 | Miyagawa et al. | |

(Continued)

FOREIGN PATENT DOCUMENTS

| | | |
|---|---|---|
| CN | 102447805 | 5/2012 |
| CN | 104735281 | 6/2015 |

(Continued)

*Primary Examiner* — Erica S Lin
*Assistant Examiner* — Tracey M McMillion
(74) *Attorney, Agent, or Firm* — Workman Nydegger

(57) ABSTRACT

A recording apparatus includes: a housing; a recording section that performs a recording operation on a medium and is disposed inside the housing; a storage section that stores the medium; a transport route along which the medium is transported; a transport section that transports the medium; a reading section that reads an original sheet and is positioned higher than the recording section; a supply section that supplies the original sheet to the reading section; and a supply route through which the original sheet passes. Each of the supply and transport routes is formed at substantially right angles to a width of the housing. The transport route has a curved section in which the medium is turned over. The reading section is positioned behind the recording section in a depth direction from the front to rear surface of the housing.

16 Claims, 5 Drawing Sheets

(56) References Cited

U.S. PATENT DOCUMENTS

2013/0286433 A1* 10/2013 Matsushima ...... H04N 1/00519
　　　　　　　　　　　　　　　　　　　　358/1.15
2014/0211283 A1　　7/2014　Mori
2015/0181062 A1　　6/2015　Takahata et al.
2018/0281430 A1　10/2018　Ohta et al.

FOREIGN PATENT DOCUMENTS

| JP | 2014-145996 A | 8/2014 |
| JP | 2015-211415 | 11/2015 |
| JP | 2018-174519 A | 11/2018 |
| JP | 2019-059590 | 4/2019 |

* cited by examiner

RECORDING APPARATUS

The present application is based on, and claims priority from JP Application Serial Number 2019-095327, filed May 21, 2019, the disclosure of which is hereby incorporated by reference herein in its entirety.

BACKGROUND

1. Technical Field

The present disclosure relates to recording apparatuses.

2. Related Art

JP-A-2018-174519 discloses an image forming apparatus, which is one example of recording apparatuses. This image forming apparatus includes: an image reading section that reads an image on an original sheet; an image forming section that forms an image on a medium; a sheet feeding section that feeds the original sheet to the image reading section; and a cassette that stores the medium. When receiving the original sheet from the sheet feeding section, the image reading section reads the image on the original sheet. When receiving the medium from the cassette, the image forming section forms the image on the medium. In this image forming apparatus, the image reading section is positioned over the image forming section.

In the above image forming apparatus, the image reading section is vertically aligned with the image forming section. In other words, the image reading section is overlaid on the image forming section as viewed from the top of the image forming apparatus. In this case, the image forming apparatus needs to have a considerable height.

SUMMARY

The present disclosure is a recording apparatus that includes a housing. A recording section that performs a recording operation on a medium is disposed inside the housing. A storage section stores the medium. A transport route along which the medium is transported extends between the storage section and the recording section. A transport section transports the medium along the transport route. A reading section that reads an original sheet is positioned higher than the recording section. A supply section supplies the original sheet to the reading section. An ejection section ejects the original sheet that has been read by the reading section. A supply route through which the original sheet passes extends between the supply section and the ejection section. The housing has a front surface with an ejection hole through which the medium on which the recording section has performed the recording operation is ejected. Each of the supply route and the transport route is formed at substantially right angles to a width of the housing. The transport route has a curved section in which the medium being transported from the storage section to the recording section is turned over. The reading section is positioned behind the recording section in a depth direction, which is a direction from the front surface of the housing to a rear surface of the housing.

DESCRIPTION OF EXEMPLARY EMBODIMENTS

The following describes a recording apparatus according to some embodiments of the present disclosure with reference to the accompanying drawings. The recording apparatus may be an ink jet printer that records some letters, pictures, charts, and images on a medium such as a paper sheet by discharging ink or other liquid onto the medium.

Figure 1:
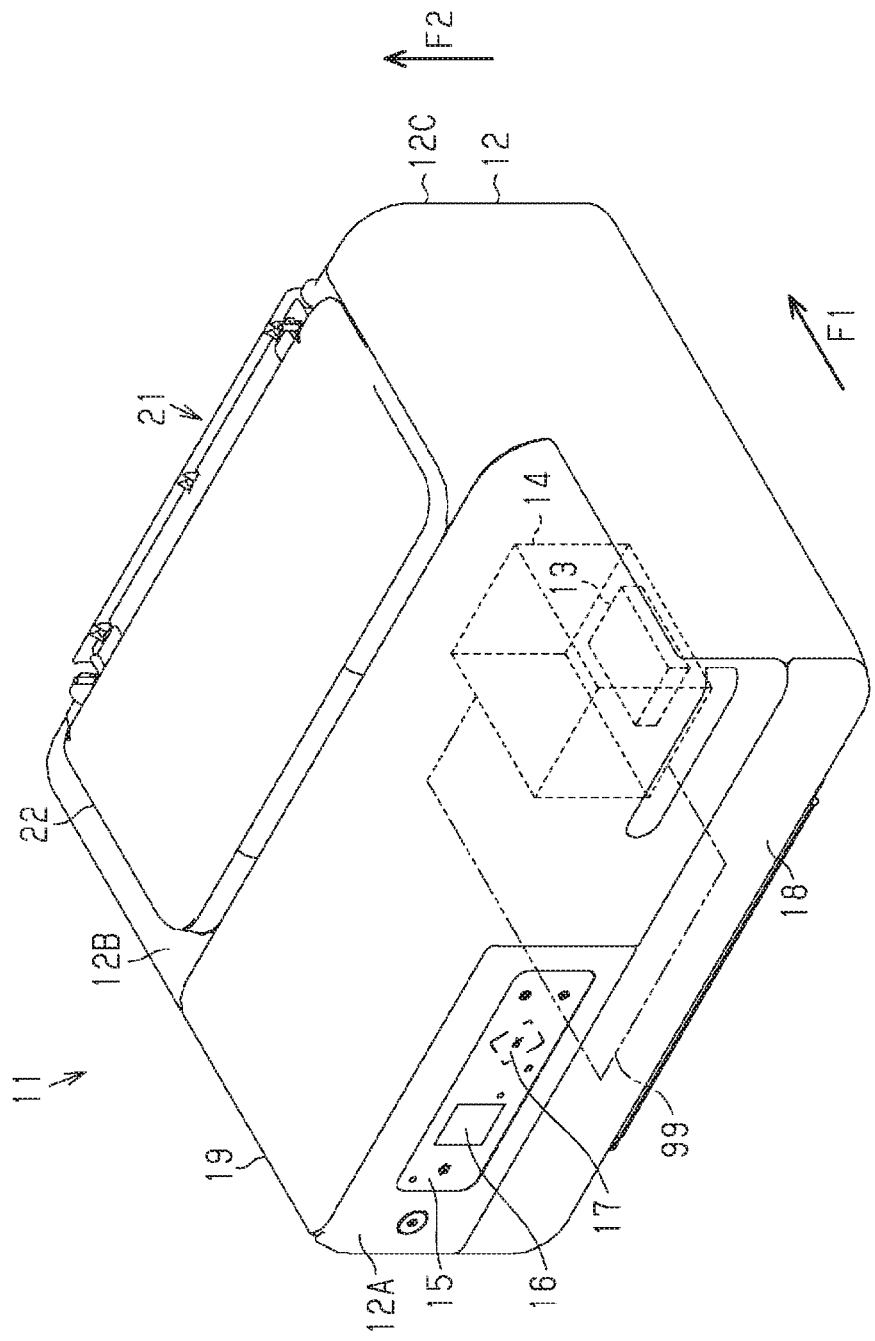
FIG. 1 is a perspective view of a recording apparatus according to an embodiment of the present disclosure.

As illustrated in FIG. 1, the recording apparatus 11 includes a housing 12 in which a recording section 13 is disposed. The recording section 13 performs a recording operation on a medium 99. As an example, the recording section 13 may be a head that discharges liquid onto the medium 99. In this case, the recording section 13 records an image on the medium 99 by discharging the liquid onto the medium 99 being transported inside the housing 12.

The recording apparatus 11 further includes a carriage 14 that scans the medium 99. The carriage 14 is equipped with the recording section 13. As an example, the recording apparatus 11 may be a serial type of printer. As another example, the recording apparatus 11 may be a line type of printer in which a recording section 13 is formed across the width of the medium 99.

The recording apparatus 11 further includes an operation section 15 to be used by a user to operate the recording apparatus 11. For example, the operation section 15 includes: a display screen 16 on which information is to be displayed; and an operation button 17 through which the user gives an operational instruction to the recording apparatus 11. In one embodiment, the operation section 15 may be disposed on a front surface 12A of the housing 12.

The recording apparatus 11 further includes an ejection cover 18 on the front surface 12A of the housing 12. The ejection cover 18 is attached to the housing 12 in an openable and closable manner; the ejection cover 18 is closed in the example of FIG. 1. When the ejection cover 18 is opened, the medium 99 on which an image has been recorded can be ejected from the recording apparatus 11 to the outside. In this case, the medium 99 on which an image has been recorded can be ejected from the housing 12 in the forward direction. In one embodiment, the front surface 12A of the housing 12 may correspond to a surface through which the medium 99 passes after an image has been recorded on the medium 99 and before the medium 99 is ejected to the outside of the housing 12.

Figure 2:
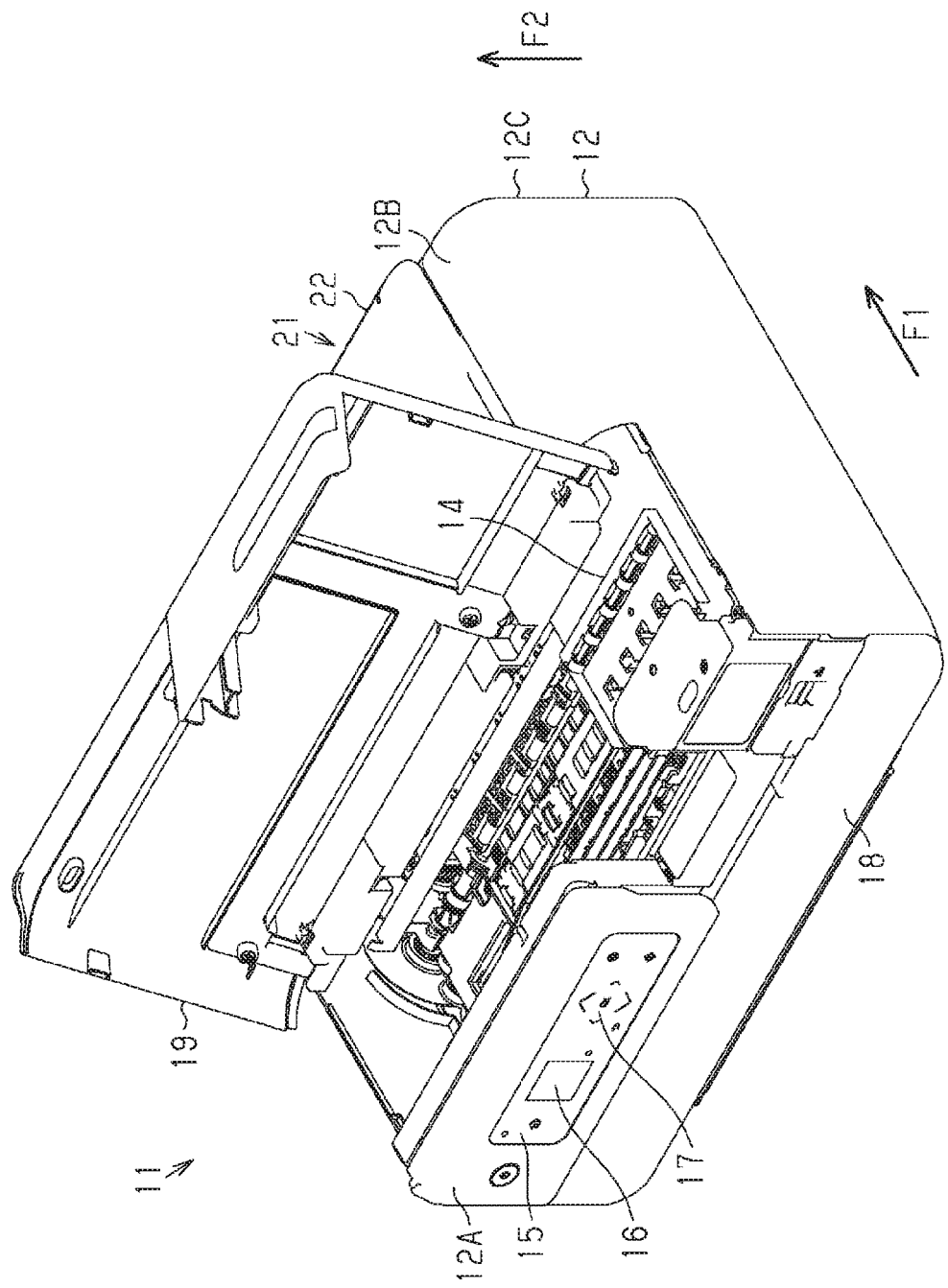
FIG. 2 is a perspective view of the recording apparatus with the maintenance cover being open.

As illustrated in FIG. 2, the recording apparatus 11 further includes a maintenance cover 19 that is opened to expose the interior of the housing 12 to the outside. In one embodiment, the carriage 14 in the housing 12 may be exposed when the maintenance cover 19 is opened. The maintenance cover 19 is attached to the housing 12 in an openable and closable manner. The user can maintain the recording apparatus 11 by opening the maintenance cover 19. For example, by opening the maintenance cover 19, the user can remove the medium 99 from the housing 12 if a medium 99 is stuck inside the housing 12 or can refill the recording section 13 with the liquid.

Figure 3:
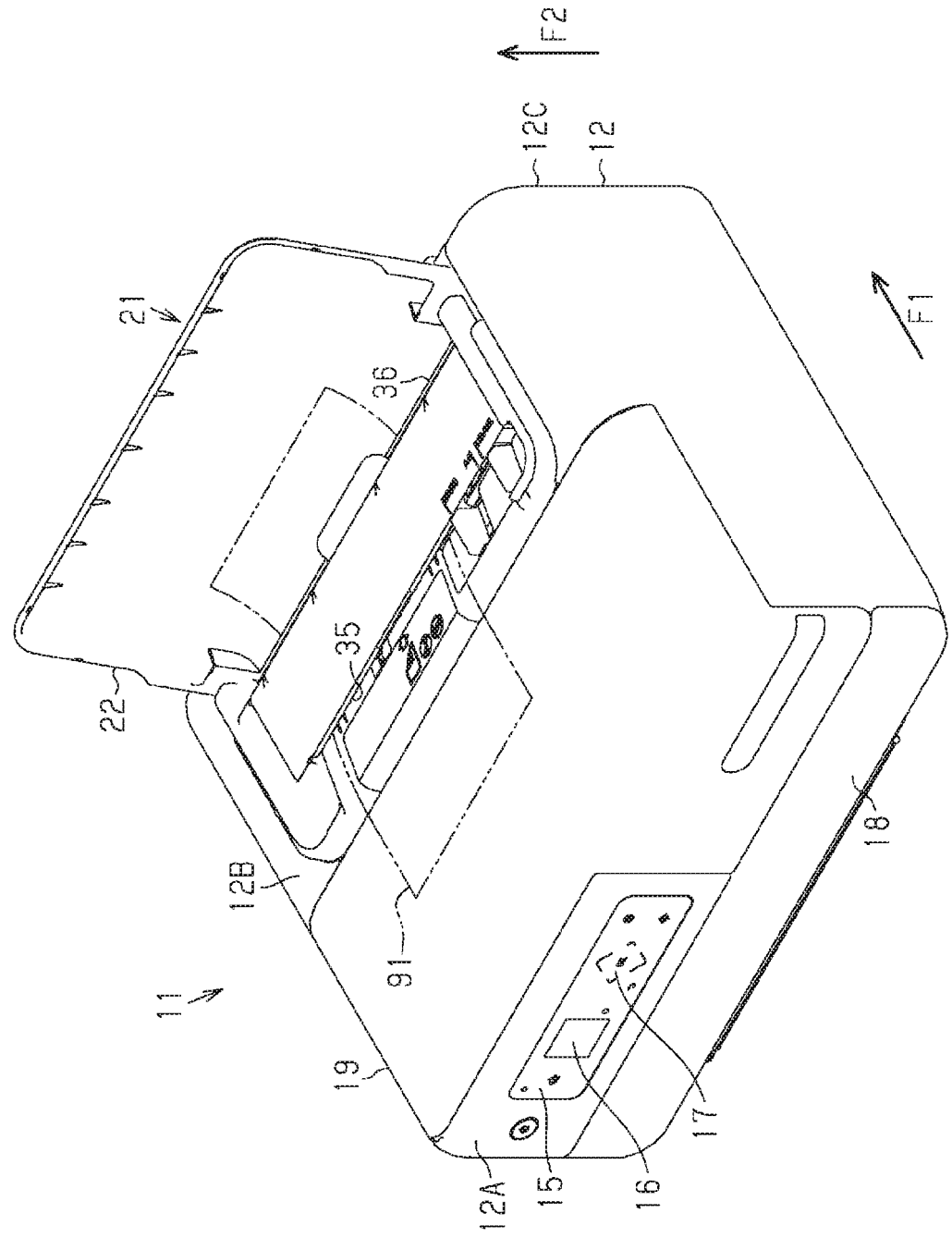
FIG. 3 is a perspective view of the recording apparatus with the guide member being in an upright position.

As illustrated in FIG. 3, the recording apparatus 11 further includes a reading unit 21 on the upper portion of the housing 12. The reading unit 21 can read an original sheet 91 such as a paper sheet. More specifically, when receiving the original sheet 91, the reading unit 21 reads some images, letters, graphs, or pictures on the original sheet 91. In this case, the reading unit 21 may be a sheet-feed type scanner.

When the maintenance cover 19 is closed, the reading unit 21 is positioned laterally to the maintenance cover 19 in a depth direction F1 in the upper portion of the housing 12. The depth direction F1 corresponds to the direction from the front surface 12A of the housing 12 to a rear surface 12C of the housing 12. The rear surface 12C of the housing 12 is positioned on the opposite side of the front surface 12A of the housing 12. When the maintenance cover 19 is closed, the reading unit 21 is positioned behind the maintenance cover 19 in the depth direction F1.

The reading unit 21 may have a guide member 22 that guides the original sheet 91 being fed. The guide member 22 may guide the original sheet 91 to be read. The guide member 22 may be attached to the housing 12 in an openable and closable manner; the guide member 22 is open in the example of FIG. 3.

When being in the upright position, the guide member 22 may guide the original sheet 91. In one embodiment, when being in the upright position, the guide member 22 may serve as a tray on which the original sheet 91 that has been read is placed. In this case, the guide member 22 may receive and guide the original sheet 91. Alternatively, the guide member 22 may serve as a tray on which the original sheet 91 to be read is placed. In one embodiment, the original sheet 91 may be placed on the maintenance cover 19 in the closed state and then be fed to the reading unit 21.

When being in the lateral position, the guide member 22 may cover the reading unit 21. In this case, for example, the guide member 22 may suppress dust in the air from entering the reading unit 21.

Figure 4:
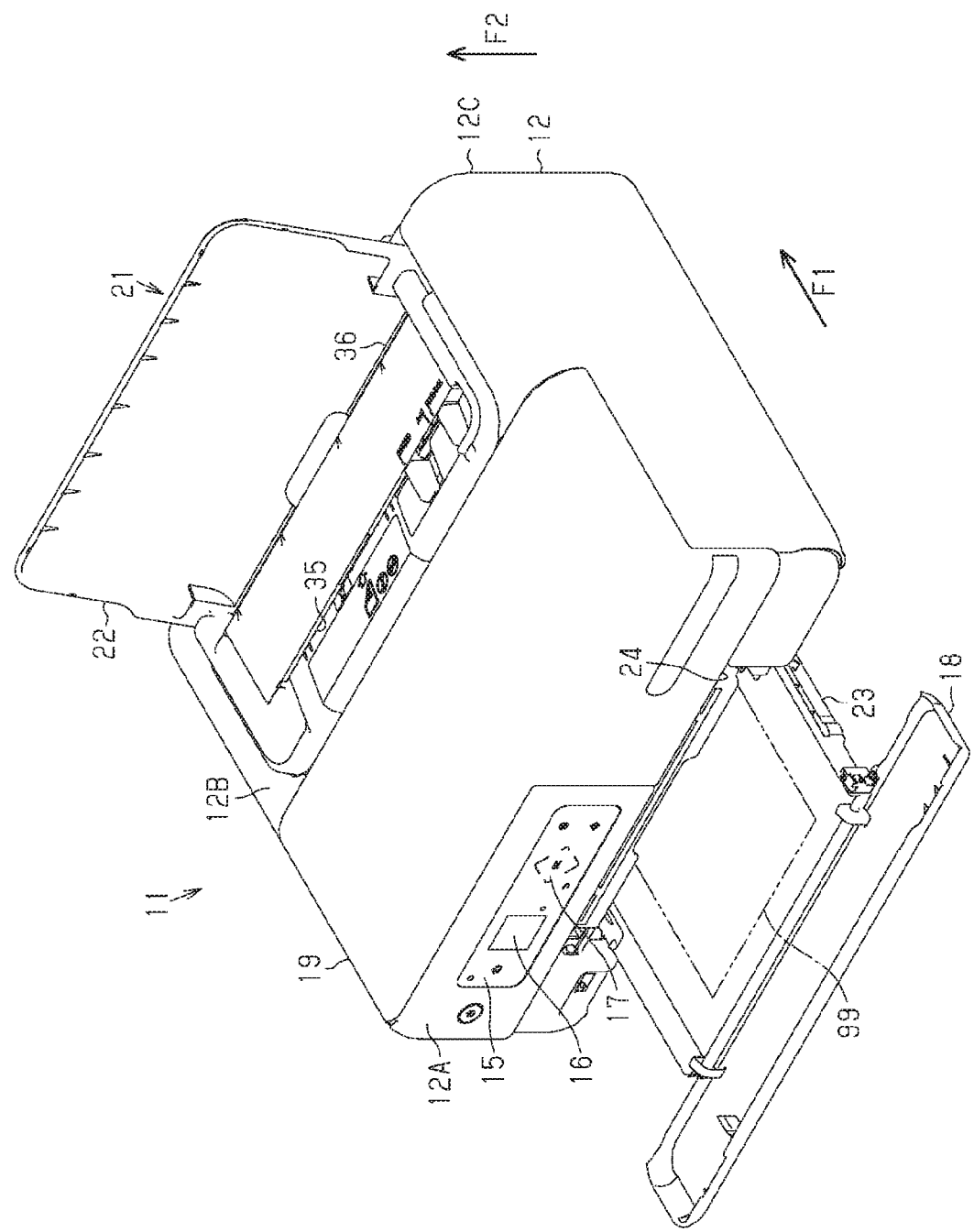
FIG. 4 is a perspective view of the recording apparatus with the storage section pulled out.

As illustrated in FIG. 4, the recording apparatus 11 further includes a storage section 23 that stores the medium 99 on which an image is to be recorded. The storage section 23 is detachably attached to the housing 12. In one embodiment, for example, the storage section 23 may be a cassette that stores a stack of media 99. The storage section 23 is detachable from the front surface 12A of the housing 12; the storage section 23 is pulled out from the housing 12 in the example of FIG. 4.

The storage section 23 is equipped with the ejection cover 18. When the storage section 23 is pulled out from the housing 12, the ejection cover 18 is folded down. In short, the ejection cover 18 is pivotable around the front edge of the storage section 23.

The front surface 12A of the housing 12 has an ejection hole 24 through which the medium 99 on which the recording section 13 has recorded an image is to be ejected. When the ejection cover 18 is folded down, the ejection hole 24 is exposed.

Figure 5:
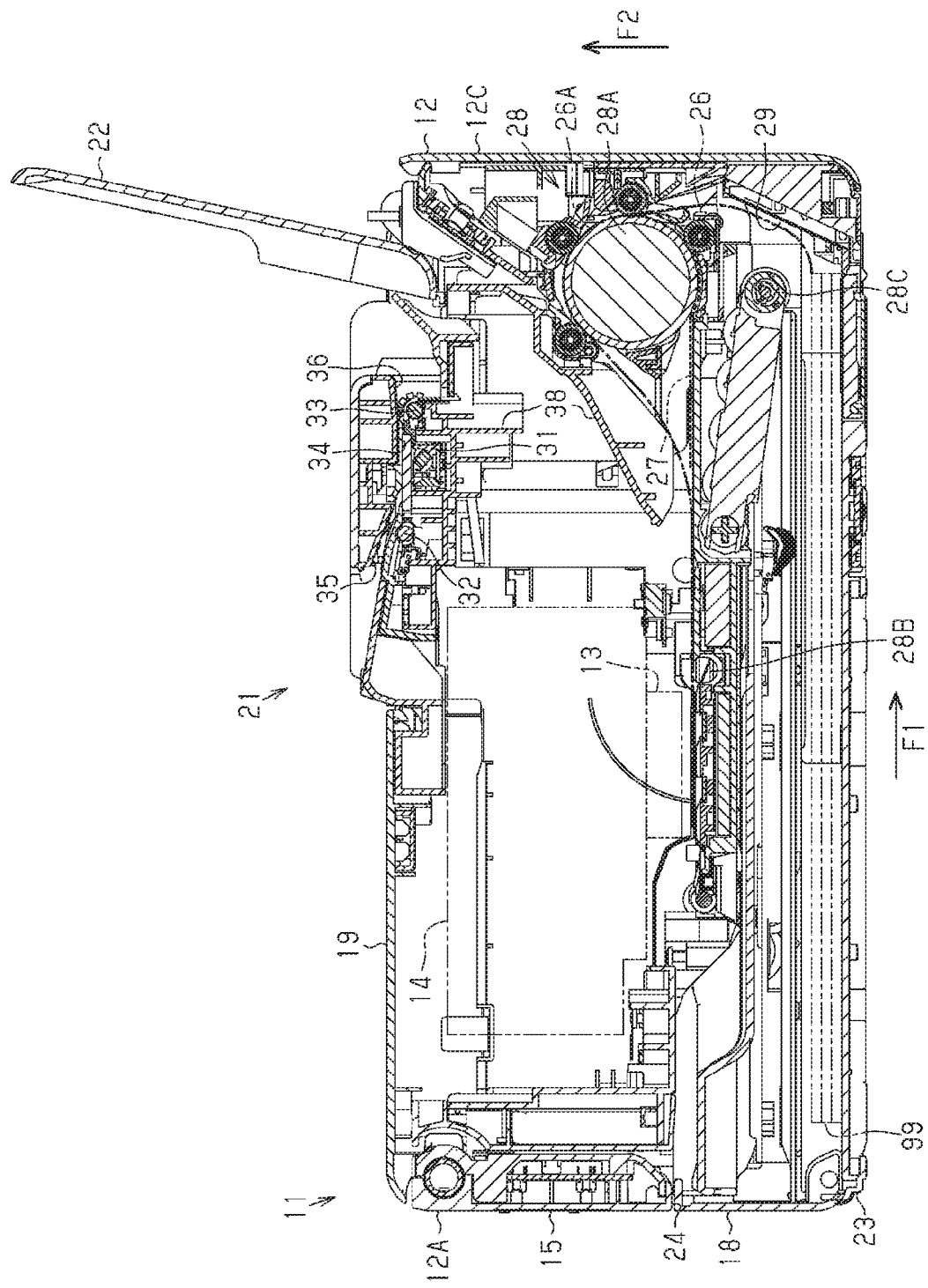
FIG. 5 is a cross-sectional view of the recording apparatus.

As illustrated in FIG. 5, the recording apparatus 11 further includes a transport route 26 along which the medium 99 is to be transported; the transport route 26 extends between the storage section 23 and the recording section 13. Along the transport route 26, the medium 99 is transported from the storage section 23 to the recording section 13. In FIG. 5, the transport route 26 is indicated by the dashed line in the housing 12.

The transport route 26 has a curved section 26A in which the medium 99 being transported from the storage section 23 to the recording section 13 is turned over. The curved section 26A is a curved, extended portion of the transport route 26. When being transported along the transport route 26, the medium 99 is curled in the curved section 26A.

The recording apparatus 11 further includes a turnover route 27 along which the medium 99, one surface of which has an image recorded thereon, is returned to the transport route 26. In FIG. 5, the turnover route 27 is indicated by the broken line in the housing 12. The turnover route 27 is disposed to couple the upstream and downstream portions of the transport route 26. Points at which the turnover route 27 is coupled to the transport route 26 are disposed so as to face each other with the curved section 26A therebetween.

When images are recorded on both the surfaces, or first and second surfaces, of a medium 99, for example, the medium 99 is transported to the turnover route 27. After an image has been recorded on the first surface of the medium 99, the medium 99 is transported in the direction opposite to the regular direction along the transport route 26 and reaches the turnover route 27. Then, by way of the turnover route 27, the medium 99 is returned to the transport route 26 and transported to the recording section 13 along the transport route 26. In this case, the second surface of the medium 99, which is opposite to the first surface on which the image has been recorded, faces the recording section 13. Then, another image is recorded on the second surface of the medium 99. In this way, the recording apparatus 11 records the images on both the surfaces of the medium 99.

Along the transport route 26, a medium 99 is transported in the two directions: a first direction and a second direction. The first direction corresponds to the direction from the front surface 12A to the rear surface 12C, whereas the second direction corresponds to the direction from the rear surface 12C to the front surface 12A. When an image is recorded on the medium 99 stored in the storage section 23, the medium 99 is first transported in the first direction along the transport route 26. After having passed through turnover route 27, the medium 99 is transported in the second direction along the transport route 26.

The recording apparatus 11 further includes a transport section 28 that transports a medium 99 along the transport route 26. The transport section 28 transports the medium 99 from the storage section 23 to the recording section 13. For example, the transport section 28 may include a plurality of rollers arranged along the transport route 26.

The transport section 28 may include a turnover roller 28A that turns over the medium 99 being transported from the storage section 23 to the recording section 13. The turnover roller 28A may transport the medium 99 while curling the medium 99, thereby turning over the medium 99 being transported from the storage section 23 to the recording section 13. In one embodiment, the turnover roller 28A may be disposed with its circumference being in contact with the curved section 26A of the transport route 26. In short, the curved section 26A may be a portion of the transport route 26 which extends along the circumference of the turnover roller 28A.

The transport section 28 further includes a transport roller 28B that corrects the skew, or the angle, of the medium 99 being transported along the transport route 26. When the medium 99 is brought into contact with the transport roller 28B that is not rotating, the skew of the medium 99 is corrected. In one embodiment, the turnover roller 28A may transport the medium 99 and then may bring the medium 99 into contact with the transport roller 28B.

The transport roller 28B is positioned laterally to the recording section 13 in the depth direction F1. More specifically, the transport roller 28B is positioned behind the recording section 13. The transport roller 28B may be one of the plurality of rollers constituting the transport section 28 and may be positioned downstream of any other roller on the transport route 26.

The transport section 28 further includes a pickup roller 28C that picks up the medium 99 from the storage section 23. The pickup roller 28C makes contact with the uppermost one of a plurality of media 99 stored in the storage section 23. The pickup roller 28C rotates the medium 99 while being in contact with the uppermost medium 99, thereby picking up this medium 99 from the storage section 23.

In one embodiment, the pickup roller 28C may be positioned below the turnover roller 28A and transport the medium 99 to the turnover roller 28A. The pickup roller 28C may be one of the plurality of rollers constituting the transport section 28 and may be positioned upstream of any other roller on the transport route 26.

The recording apparatus 11 may further include a separation section 29 that separates a medium 99 from other media 99 stored in the storage section 23. If a plurality of media 99 are picked up from the storage section 23, for example, the separation section 29 may separate the media 99 from one another. In one embodiment, the separation section 29 may separate the media 99 from one another when the pickup roller 28C picks up a plurality of media 99.

In one embodiment, the separation section 29, which forms a portion of the transport route 26, may be a member having a plurality of fine projections on its surface, for example. When a medium 99 is picked up from the storage section 23, one side of the medium 99 is brought into contact with the surface of the separation section 29 and transported to the turnover roller 28A. In this case, if a plurality of media 99 are picked up from the storage section 23, the media 99 other than the first one which are not in contact with the pickup roller 28C is stuck on the fine projections formed on the surface of the separation section 29. As a result, only the first medium 99 makes contact with the pickup roller 28C and transported to the turnover roller 28A. In this way, the separation section 29 can separate the media 99 from one another.

The recording apparatus 11 further includes: a reading section 31 that reads the original sheet 91; and a supply section 32 that supplies the original sheet 91 to the reading section 31. For example, the reading section 31 and the supply section 32 may be provided in the reading unit 21. The recording apparatus 11 further includes: an ejection section 33 through which the original sheet 91 read by the reading section 31 is ejected; and a supply route 34 along which the original sheet 91 is transported from the supply section 32 to the ejection section 33. In one embodiment, the guide member 22, the ejection section 33, and the supply route 34 may be further provided in the reading unit 21.

The reading section 31, which may be an image sensor module, for example, is positioned higher than the recording section 13. For example, the reading section 31 may include: a light emitting element that emits light toward the original sheet 91; and a light receiving element that receives the light reflected on the original sheet 91. The reading section 31 is fixed to the housing 12. The reading section 31 reads the original sheet 91 being transported along the supply route 34 at a location below this original sheet 91. In one embodiment, the reading section 31 may read the lower surface of the original sheet 91 placed on the maintenance cover 19.

Each of the supply route 34 and the transport route 26 is formed at substantially right angles to the width of the housing 12. The supply route 34 extends in the depth direction F1, whereas the transport route 26 extends in both the depth direction F1 and the opposite direction. The width of the housing 12 extends in the direction different from the depth direction F1 and corresponds to the width of the recording apparatus 11.

The supply section 32, which may be a pair of rollers, for example, feeds the original sheet 91 in the depth direction F1. The ejection section 33, which may also be a pair of rollers, for example, feeds the original sheet 91 in the depth direction F1 and then ejects the original sheet 91 to the guide member 22. In short, the cooperation of the supply section 32 and the ejection section 33 feed the original sheet 91 along the supply route 34.

Provided on the supply route 34 are a supply aperture 35 through which the original sheet 91 is supplied to the reading section 31 and an ejection aperture 36 through which the original sheet 91 that has been read by the reading section 31 is ejected. When being supplied to the recording apparatus 11 through the supply aperture 35, the original sheet 91 is transported to the reading unit 21 and then is ejected to the outside through the ejection aperture 36. To read the original sheet 91 with the reading unit 21, it is necessary to place the original sheet 91 on the maintenance cover 19 with its front portion inserted into the supply aperture 35.

The supply section 32, the reading section 31, and the ejection section 33 are arranged along the supply route 34. More specifically, the supply section 32, the reading section 31, and the ejection section 33 are arranged in this order in the depth direction F1 along the supply route 34. The supply section 32 includes a supply roller, and the ejection section 33 includes an ejection roller.

The guide member 22, when being in the lateral position, covers both the supply aperture 35 and the ejection aperture 36, thereby suppressing dust in the air from entering the reading unit 21. The recording apparatus 11 further includes a unit frame 38 that supports the reading unit 21. More specifically, the unit frame 38 fixes the reading unit 21 to the housing 12.

The unit frame 38 is equipped with the curved section 26A. For example, the unit frame 38 may be formed so as to cover the turnover roller 28A, forming the curved section 26A. In this case, the unit frame 38 may form at least a portion of the curved section 26A. The unit frame 38 includes a member that supports the reading unit 21 and a member that forms the curved section 26A. In this embodiment, the number of components of the recording apparatus 11 can be made smaller than that of components of a recording apparatus in which a curved section is made of an independent member.

The reading section 31 is positioned behind the recording section 13 in the depth direction F1. Thus, the reading section 31 is not positioned over the recording section 13. In other words, the reading section 31 does not overlap the recording section 13 as viewed from the top of the housing 12.

If a reading section is positioned over a recording section, or if the reading section overlaps the recording section as viewed from the top of a housing, a recording apparatus needs to have a considerable height. In this embodiment, however, the reading section 31 is positioned behind the recording section 13 in the depth direction F1. This configuration successfully achieves height reduction in the recording apparatus 11, compared to the above configuration.

The reading section 31 may be positioned between transport roller 28B and the curved section 26A in the depth direction F1. In other words, the reading section 31 does not have to overlap the transport roller 28B or the curved section 26A as viewed from the top of the housing 12. This configuration successfully achieves height reduction in the recording apparatus 11, compared to the configuration in which a reading section overlaps a curved section or a transport roller as viewed from the top of a housing.

The separation section 29 may be positioned behind the reading section 31 in the depth direction F1. Thus, the separation section 29 does not have to overlap the reading section 31 as viewed from the top of the housing 12. This configuration successfully achieves height reduction in the recording apparatus 11, compared to the configuration in which the separation section 29 overlaps the reading section 31 as viewed from the top of the housing 12.

The separation section 29 may be positioned behind the reading unit 21 in the depth direction F1 when the guide member 22 is in the lateral position. Thus, the separation section 29 does not have to overlap the reading unit 21 as viewed in the top of the housing 12 when the guide member 22 is in the lateral position. This configuration successfully achieves height reduction in the recording apparatus 11.

The carriage 14 may be aligned with the reading section 31 in a height direction F2. Thus, the carriage 14 may be overlaid on or overlap the reading section 31 as viewed from the front or rear of the housing 12. In this embodiment, the upper side of the carriage 14 may be aligned, in the height direction F2, with the lower side of the reading section 31.

The height direction F2 is a direction used as an index for the height of the recording apparatus 11. In this embodiment, the recording apparatus 11 is usually installed on a level surface, in which case the height direction F2 is opposite to the direction of gravitational force.

If a carriage is shifted from a reading section in the height direction F2, a recording apparatus needs to have a considerable height. Compared to this configuration, the configuration in which the carriage 14 is aligned with the reading section 31 in the height direction F2 successfully achieves height reduction in the recording apparatus 11. Compared to the configuration in which the carriage 14 is positioned above or below the reading section 31, for example, the configuration in which the carriage 14 is aligned with the reading section 31 in the height direction F2 successfully achieves height reduction in the recording apparatus 11.

The maintenance cover 19 may be aligned with the reading section 31 in the height direction F2. Thus, the maintenance cover 19 may be overlaid on or overlap the reading section 31 as viewed from the front or rear of the housing 12.

If the maintenance cover 19 is shifted from the reading section 31 in the height direction F2, the recording apparatus 11 needs to have a considerable height. Compared to this configuration, the configuration in which the maintenance cover 19 is aligned with the reading section 31 in the height direction F2 successfully achieves height reduction in the recording apparatus 11. Compared to the configuration in which the maintenance cover 19 is positioned above or below the reading section 31, for example, the configuration in which the maintenance cover 19 is aligned with the reading section 31 in the height direction F2 successfully achieves height reduction in the recording apparatus 11.

The following describes the effects of the recording apparatus 11 in this embodiment.

1. The reading section 31 is positioned behind the recording section 13 in the depth direction F1. Thus, the reading section 31 is not positioned over the recording section 13. In other words, the reading section 31 does not overlap the recording section 13 as viewed from the top of the housing 12. This configuration successfully achieves height reduction in the recording apparatus 11, compared to the configuration in which the reading section 31 overlaps the recording section 13 as viewed from the top of the housing 12.

2. The supply section 32, the reading section 31, and the ejection section 33 are arranged along the supply route 34. This configuration enables the reading section 31 to read the original sheet 91 smoothly.

3. The reading section 31 may be positioned between transport roller 28B and the curved section 26A in the depth direction F1. This configuration successfully achieves height reduction in the recording apparatus 11, for example, compared to the configuration in which a reading section overlaps a curved section or a transport roller as viewed from the top of a housing.

4. The separation section 29 may be positioned behind the reading section 31 in the depth direction F1. This configuration successfully achieves height reduction in the recording apparatus 11, for example, compared to the configuration in which the separation section 29 overlaps the reading section 31 as viewed from the top of the housing 12.

5. The carriage 14 may be aligned with the reading section 31 in the height direction F2. This configuration successfully achieves height reduction in the recording apparatus 11, compared to the configuration in which the carriage 14 is shifted from the reading section 31 in the height direction F2, such as the configuration in which the carriage 14 is positioned below or above the reading section 31.

6. The maintenance cover 19 may be aligned with the reading section 31 in the height direction F2. This configuration successfully achieves height reduction in the recording apparatus 11, compared to the configuration in which the maintenance cover 19 is shifted from the reading section 31 in the height direction F2, such as the configuration in which the maintenance cover 19 is positioned below or above the reading section 31.

7. The unit frame 38 supports the reading unit 21 and forms the curved section 26A. This configuration successfully achieves a decreased number of components of the recording apparatus 11, compared to the configuration in which a curved section is made of an independent member.

The foregoing embodiment may be modified in the following ways. It should be noted that this embodiment and some modifications that will be described below may be combined together unless their techniques are inconsistent with one another.

The upper surface 12B of the housing 12 may serve as a tray on which the original sheet 91 to be read is placed, instead of a tray on which the original sheet 91 has been read is placed. The reading section 31 may be disposed above the supply route 34 instead of below the supply route 34, or two reading sections 31 may be individually disposed above and below the supply route 34. The separation section 29 may include a pair of rollers that pinches a medium 99 that has been picked up by the pickup roller 28C. In this case, for example, the rollers may have different rotational resistances in order to separate the media 99 from one another.

The recording apparatus 11 may be configured such that media 99 can be supplied from the rear surface 12C side of the housing 12. Each medium 99 may be made of paper, metal, plastic, or fabric, for example.

To record an image on a medium 99, the recording section 13 may heat or punch the medium 99 instead of discharging liquid.

The liquid to be discharged from the recording section 13 is not limited to ink; alternatively, for example, the liquid may be a liquid body in which particles of a functional material are dispersed or mixed. More specifically, for example, the recording section 13 may discharge a liquid body in which an electrode or pixel material used to manufacture liquid crystal displays (LCDs), electro luminescence (EL) displays, or surface-emitting displays is dispersed or dissolved.

The following describes technical ideas and effects that can be derived from the foregoing embodiment and modifications.

A. A recording apparatus includes: a housing; a recording section that performs a recording operation on a medium, the recording section being disposed inside the housing; a storage section that stores the medium; a transport route along which the medium is transported, the transport route extending between the storage section and the recording section; a transport section that transports the medium along the transport route; a reading section that reads an original sheet, the reading section being positioned higher than the recording section; a supply section that supplies the original sheet to the reading section; an ejection section that ejects the original sheet that has been read by the reading section; and a supply route through which the original sheet passes, the supply route extending between the supply section and the ejection section. The housing has a front surface with an ejection hole through which the medium on which the recording section has performed the recording operation is ejected. The supply route is formed at substantially right angles to a width of the housing. The transport route is formed at substantially right angles to the width of the housing. The transport route has a curved section in which the medium being transported from the storage section to the recording section is turned over. The reading section is positioned behind the recording section in a depth direction, the depth direction being a direction from the front surface of the housing to a rear surface of the housing.

With the above configuration, the reading section is not positioned over the recording section. In other words, the reading section does not overlap the recording section as viewed from the top of the housing. Consequently, this configuration successfully achieves height reduction in the recording apparatus, compared to the configuration in which the reading section overlaps the recording section as viewed from the top of the housing.

B. In the above recording apparatus, the supply section, the reading section, and the ejection section may be arranged along the supply route.

The above configuration enables the reading section to read the original sheet smoothly.

C. In the above recording apparatus, the transport section may have a transport roller, and the reading section may be positioned between the transport roller and the curved section in the depth direction.

The above configuration successfully achieves height reduction in the recording apparatus, for example, compared to the configuration in which a reading section overlaps a curved section or a transport roller as viewed from the top of a housing.

D. The above recording apparatus may further include a separation section that separates the medium from other media stored in the storage section. The separation section may be positioned behind the reading section in the depth direction.

This configuration successfully achieves height reduction in the recording apparatus, for example, compared to the configuration in which the separation section overlaps the reading section as viewed from the top of the housing.

E. The above recording apparatus may further include a carriage that scans the medium. The carriage may be equipped with the recording section and be aligned with the reading section in a height direction.

The above configuration successfully achieves height reduction in the recording apparatus, compared to the configuration in which the carriage is shifted from the reading section in the height direction, such as the configuration in which the carriage is positioned below or above the reading section.

F. The above recording apparatus may further include a maintenance cover that is opened to expose an interior of the housing. The maintenance cover may be aligned with the reading section in the height direction.

The above configuration successfully achieves height reduction in the recording apparatus, compared to the configuration in which the maintenance cover is shifted from the reading section in the height direction, such as the configuration in which the maintenance cover is positioned below or above the reading section.

G. The above recording apparatus may further include: a reading unit equipped with the reading section and the supply section; and a unit frame that supports the reading unit. The unit frame may form the curved section.

Since the unit frame forms the curved section, the above configuration successfully achieves a decreased number of components of the recording apparatus, compared to the configuration in which a curved section is made of an independent member.

What is claimed is:
1. A recording apparatus comprising:
   a housing;
   a recording section that performs a recording operation on a medium, the recording section being disposed inside the housing;
   a storage section that stores the medium;
   a transport route along which the medium is transported, the transport route extending between the storage section and the recording section;
   a transport section that transports the medium along the transport route;
   a reading section that reads an original sheet, the reading section being positioned higher than the recording section;
   a supply section that supplies the original sheet to the reading section;
   an ejection section that ejects the original sheet that has been read by the reading section; and
   a supply route through which the original sheet passes, the supply route extending between the supply section and the ejection section, wherein
   the housing has a front surface with an ejection hole through which the medium on which the recording section has performed the recording operation is ejected,
   the supply route is formed at substantially right angles to a width of the housing,
   the transport route is formed at substantially right angles to the width of the housing,
   the transport route has a curved section in which the medium being transported from the storage section to the recording section is turned over,
   the reading section is positioned behind the recording section in a depth direction, the depth direction being a direction from the front surface of the housing to a rear surface of the housing, and
   the ejection hole is positioned below the reading section.

2. The recording apparatus according to claim 1, wherein the supply section, the reading section, and the ejection section are arranged along the supply route.

3. The recording apparatus according to claim 2, wherein the supply section, the reading section, and the ejection section are arranged along the depth direction.

4. The recording apparatus according to claim 1, wherein the transport section has a transport roller, and
the reading section is positioned between the transport roller and the curved section in the depth direction.

5. The recording apparatus according to claim 4, wherein the transport roller is positioned upstream of the recording section.

6. The recording apparatus according to claim 1, further comprising a separation section that separates the medium from other media stored in the storage section,
the separation section being positioned behind the reading section in the depth direction.

7. The recording apparatus according to claim 1, further comprising a carriage that scans the medium, the carriage being equipped with the recording section, wherein the carriage overlaps the reading section when viewed in the depth direction.

8. The recording apparatus according to claim 1, further comprising a
maintenance cover that is opened to expose an interior of the housing,
the maintenance cover being aligned with the reading section in the height direction.

9. The recording apparatus according to claim 1, further comprising: a reading unit equipped with the reading section and the supply section; and a unit frame that supports the reading unit, the unit frame forming the curved section.

10. The recording apparatus according to claim 1, wherein the reading section does not overlap the recording section in the depth direction.

11. The recording apparatus according to claim 1, wherein the reading section does not overlap the transport roller in the depth direction, and
the reading section does not overlap the curved section in the depth direction.

12. The recording apparatus according to claim 1, further comprising a separation section that separates the medium from other media stored in the storage section,
the separation section does not overlap the reading section in the depth direction.

13. The recording apparatus according to claim 1, wherein the front surface also has a control panel.

14. The recording apparatus according to claim 1, wherein the supply route does not have a curved portion in which the original sheet is turned over.

15. The recording apparatus according to claim 1, further comprising a carriage that scans the medium, the carriage being equipped with the recording section, wherein an upper side of the carriage is aligned with a lower side of the reading section in a height direction.

16. A recording apparatus comprising:
a housing;
a recording section that performs a recording operation on a medium, the recording section being disposed inside the housing;
a storage section that stores the medium;
a transport route along which the medium is transported, the transport route extending between the storage section and the recording section;
a transport section that transports the medium along the transport route;
a reading section that reads an original sheet, the reading section being positioned higher than the recording section;
a supply section that supplies the original sheet to the reading section;
an ejection section that ejects the original sheet that has been read by the reading section; and
a supply route through which the original sheet passes, the supply route extending between the supply section and the ejection section,
the housing having a front surface with an ejection hole through which the medium on which the recording section has performed the recording operation is ejected,
the supply route being formed at substantially right angles to a width of the housing,
the transport route being formed at substantially right angles to the width of the housing,
the transport route having a curved section in which the medium being transported from the storage section to the recording section is turned over,
the reading section and the transport route being positioned behind the recording section in a depth direction, the depth direction being a direction from the front surface of the housing to a rear surface of the housing.

* * * * *